(No Model.)
E. G. RUST.
SASH HOLDER.
No. 319,509. Patented June 9, 1885.
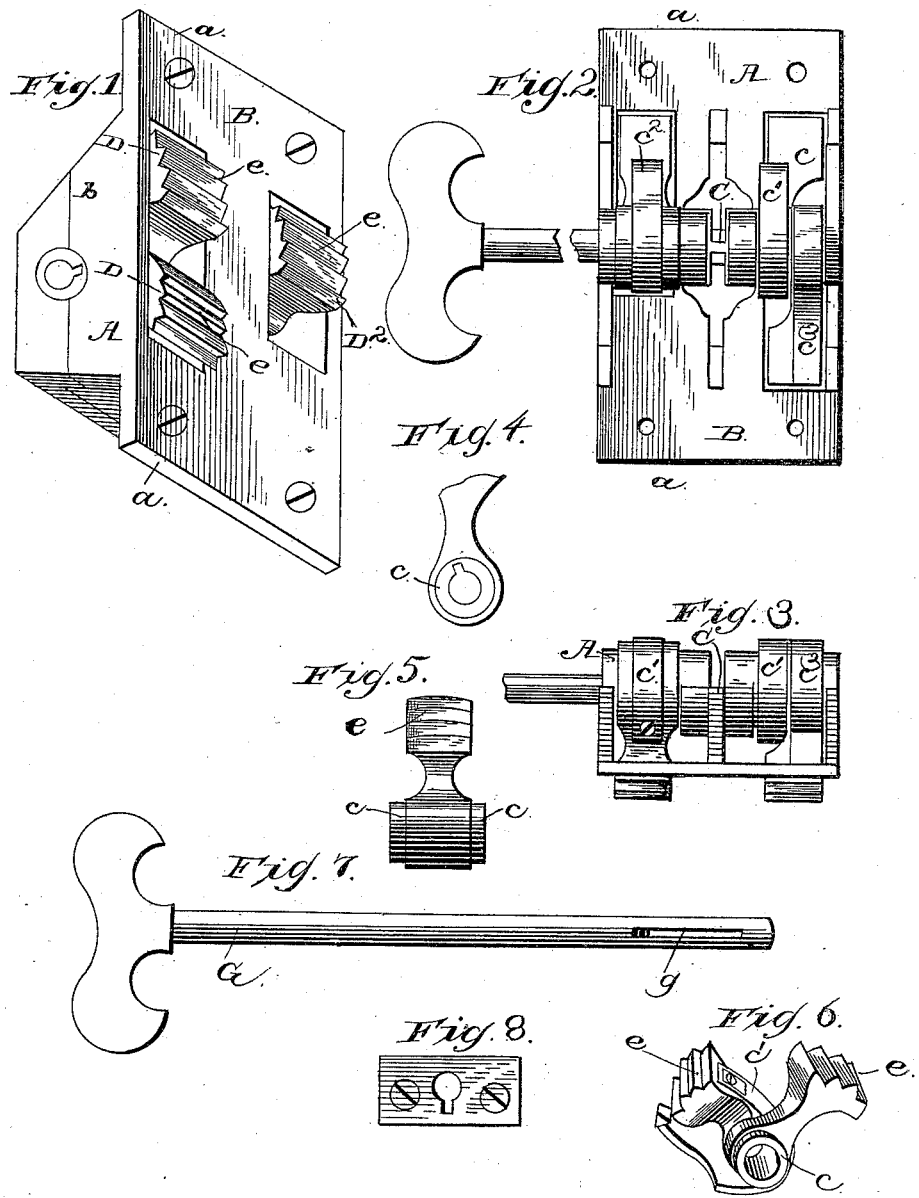
WITNESSES
M. E. Fowler
E. G. Diggers
INVENTOR
E. G. Rust
by C. A. Snow & Co
his Attorneys

UNITED STATES PATENT OFFICE.

EMORY G. RUST, OF GRAND PRAIRIE, TEXAS.

SASH-HOLDER.

SPECIFICATION forming part of Letters Patent No. 319,509, dated June 9, 1885.

Application filed November 29, 1884. (No model.)

*To all whom it may concern:*

Be it known that I, EMORY G. RUST, a citizen of the United States, residing at Grand Prairie, in the county of Dallas and State of Texas, have invented a new and useful Window-Sash Supporter and Lock, of which the following is a specification.

My invention relates to improvements in window-sash supporters, the object being to provide a combined support and lock for sashes, either when closed or open, which shall be cheap and simple in construction, effective in operation, and strong and durable.

With these ends in view the invention consists in the improved construction and combinations of parts hereinafter fully described, and pointed out in the claims.

In the drawings, Figure 1 is a perspective view of my improved sash-holder, showing the same with the key removed. Fig. 2 is a rear view with the cap removed. Fig. 3 is an end view with the cap removed. Figs. 4 and 5 are detail views of the pivoted toothed dog G. Fig. 6 is a detail perspective view of the toothed dogs, showing the spring and extension. Fig. 7 is a detail view of the operating-key, and Fig. 8 is a view of the escutcheon or key-hole plate.

In the accompanying drawings, in which like letters of reference indicate corresponding parts in all the figures, A represents a frame or casing, which is preferably cast, the same consisting of the plate B, having the flanges $a$, provided with holes or openings for the passage of screws or other fastenings for its attachment. The plate B has rearwardly-extending sides $b$, and is also provided with a centrally-located ear or lug, C. The sides $b$ and ear or lug C are provided with recesses in which are journaled the trunnions $c$, extending outwardly from the sides of dogs D D′ D². These dogs D D′ D² are preferably cast, and are formed on their bearing-faces with teeth or serrations $e$, those of the dogs D′ D² inclining upwardly, while the teeth of the dog D incline downwardly. The dog D² extends through an opening, $e'$, in the plate B, which is sufficiently large to allow the serrated or toothed end of the dog limited play. The said dog D² is so located that it will engage the edge of the upper sash, and it will be seen that when it is thrown against said edge it will hold the upper sash in a locked position. The dog D has a central passage and fits upon the trunnion of the dog D′, on the outer side of the same. The said dogs D D′ extend through an opening in the plate B, which is sufficiently large to permit said dogs to be thrown into and out of engagement with the lower sash, the dog D serving to lock the lower sash against upward movement, and the dog D′ to hold it in a raised position after dog D has been removed from engagement with the lower sash and the same raised.

In order to hold dogs D from engagement with the lower sashes, when desired or necessary, I have provided springs $c'$ $c^2$ $c^3$.

The openings extending through the several dogs are provided with recesses $d'$ communicating therewith.

For operating the several dogs I have provided a key, G, having a rib, $g$, which is adapted to fit the recess in any one of the dogs, whereby they may be either thrown into or out of engagement with the sashes. The free ends of the springs bear against the dogs with sufficient force to hold them from engagement with the sashes until turned by the key.

I claim—

The combination, with a casing having the projected ear or lug C, of the dogs D D′ D², having trunnions bearing in recesses in the sides of the casing, and in an opening in the ear or lug C, said dogs having serrated engaging-faces, the dogs D′ D² extending upwardly and the dog D downwardly, springs bearing against the dogs, said dogs being formed with passages having grooves communicating therewith, and a key having a rib to fit said grooves, as set forth.

EMORY G. RUST.

Witnesses:
J. M. STRONG,
W. H. CULLUM.